United States Patent
Ikeda et al.

(10) Patent No.: US 10,658,657 B2
(45) Date of Patent: May 19, 2020

(54) NEGATIVE ELECTRODE ACTIVE MATERIAL, AND NEGATIVE ELECTRODE AND LITHIUM ION SECONDARY BATTERY USING THE NEGATIVE ELECTRODE ACTIVE MATERIAL

(71) Applicant: TDK CORPORATION, Tokyo (JP)

(72) Inventors: Yasuhiro Ikeda, Tokyo (JP); Atsushi Sano, Tokyo (JP); Masaki Sobu, Tokyo (JP); Akinobu Nojima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 88 days.

(21) Appl. No.: 14/908,896

(22) PCT Filed: Sep. 26, 2014

(86) PCT No.: PCT/JP2014/075553
§ 371 (c)(1),
(2) Date: Jan. 29, 2016

(87) PCT Pub. No.: WO2015/046395
PCT Pub. Date: Apr. 2, 2015

(65) Prior Publication Data
US 2016/0190560 A1  Jun. 30, 2016

(30) Foreign Application Priority Data

Sep. 30, 2013 (JP) ................. 2013-203683

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/131* (2013.01); *H01M 4/134* (2013.01); *H01M 4/364* (2013.01);
(Continued)

(58) Field of Classification Search
None
See application file for complete search history.

(56) References Cited

U.S. PATENT DOCUMENTS

| 7,244,513 B2* | 7/2007 | Li ........................ C01B 33/02 428/402 |
| 2009/0186267 A1* | 7/2009 | Tiegs ................... B82Y 30/00 429/129 |

(Continued)

FOREIGN PATENT DOCUMENTS

| JP | 2001-015101 A | 1/2001 |
| JP | 2004-055505 A | 2/2004 |

(Continued)

OTHER PUBLICATIONS

Dec. 9, 2014 Written Opinion of the International Searching Authority issued in International Patent Application No. PCT/JP2014/075553.

(Continued)

*Primary Examiner* — Ula C Ruddock
*Assistant Examiner* — Anna Korovina
(74) *Attorney, Agent, or Firm* — Oliff PLC

(57) ABSTRACT

A negative electrode active material with sufficiently high discharge capacity at a high rate, and a negative electrode and a lithium ion secondary battery using the negative electrode active material. A negative electrode active material according to the invention includes a negative electrode active material particle containing silicon and silicon oxide, wherein a surface layer part of the negative electrode active material particle is a layer with lower density than a core part of the negative electrode active material particle. With such a structure of the negative electrode active material, the sufficiently high discharge capacity at a high rate can be obtained.

7 Claims, 2 Drawing Sheets

(51) Int. Cl.

| | |
|---|---|
| *H01M 4/48* | (2010.01) |
| *H01M 4/131* | (2010.01) |
| *H01M 4/134* | (2010.01) |
| *H01M 4/62* | (2006.01) |
| *H01M 10/0525* | (2010.01) |
| *H01M 4/02* | (2006.01) |
| *H01M 10/052* | (2010.01) |
| *H01M 4/485* | (2010.01) |

(52) U.S. Cl.
CPC ............ *H01M 4/386* (2013.01); *H01M 4/48* (2013.01); *H01M 4/483* (2013.01); *H01M 4/622* (2013.01); *H01M 4/625* (2013.01); *H01M 10/0525* (2013.01); *H01M 4/485* (2013.01); *H01M 10/052* (2013.01); *H01M 2004/021* (2013.01); *H01M 2220/20* (2013.01); *H01M 2220/30* (2013.01); *Y02T 10/7011* (2013.01)

(56) References Cited

U.S. PATENT DOCUMENTS

| | | | | |
|---|---|---|---|---|
| 2010/0086854 A1* | 4/2010 | Kumar | ................. | H01M 4/505 |
| | | | | 429/223 |
| 2011/0177393 A1* | 7/2011 | Park | ...................... | B82Y 30/00 |
| | | | | 429/231.8 |
| 2012/0107693 A1* | 5/2012 | Ishida | ................... | H01M 4/134 |
| | | | | 429/231.8 |
| 2012/0295155 A1* | 11/2012 | Deng | .................... | H01B 1/122 |
| | | | | 429/200 |
| 2013/0034714 A1* | 2/2013 | Canham | ................... | A61K 8/25 |
| | | | | 428/219 |
| 2013/0196158 A1* | 8/2013 | Yoshida | ................ | H01M 4/364 |
| | | | | 428/402 |
| 2014/0302396 A1* | 10/2014 | Lu | .......................... | C01B 31/36 |
| | | | | 429/231.8 |
| 2014/0349187 A1* | 11/2014 | Hirose | ................. | H01M 4/386 |
| | | | | 429/221 |

FOREIGN PATENT DOCUMENTS

| | | | |
|---|---|---|---|
| JP | 2012178299 A | 9/2012 | |
| JP | 2013131325 A | 7/2013 | |
| WO | WO 2013067956 A1 * | 5/2013 | ............. C01B 31/36 |
| WO | WO 2013094404 A1 * | 6/2013 | ............. H01M 4/386 |

OTHER PUBLICATIONS

Dec. 9, 2014 Search Report issued in International Patent Application No. PCT/JP2014/075553.

\* cited by examiner

NEGATIVE ELECTRODE ACTIVE MATERIAL, AND NEGATIVE ELECTRODE AND LITHIUM ION SECONDARY BATTERY USING THE NEGATIVE ELECTRODE ACTIVE MATERIAL

TECHNICAL FIELD

The present invention relates to a negative electrode active material, and a negative electrode and a lithium ion secondary battery using the negative electrode active material.

BACKGROUND ART

A lithium ion secondary battery is lighter in weight and has higher capacity than a nickel-cadmium battery, a nickel hydrogen battery, or the like. For this reason, the lithium ion secondary batteries have been widely used as a power supply for mobile electronic appliances. The lithium ion secondary battery is also a strong candidate for a power supply to be mounted on hybrid automobiles and electric automobiles. With the size reduction and higher sophistication of the mobile electronic appliances in recent years, the lithium ion secondary battery used for the power supply is expected to have higher capacity.

The capacity of a lithium ion secondary battery mainly depends on an active material of an electrode. As a negative electrode active material, graphite is typically used. To meet the above demand, however, it is necessary to use a negative electrode active material with higher capacity. In view of this, metal silicon (Si) with much higher theoretical capacity (4210 mAh/g) than that of graphite (372 mAh/g) has attracted attention.

An example of the negative electrode active material including such metal silicon is a mixture of silicon and silicon oxide. In the case of using the mixture of silicon and silicon oxide, the stress due to the expansion and contraction of silicon in the charging and discharging is relieved by silicon oxide. Thus, this mixture is superior to silicon in the cycle characteristics. On the other hand, the mixture of silicon and silicon oxide has low electric conductivity. Therefore, when the current density in the discharging is high relative to the battery capacity, the discharge capacity is remarkably deteriorated. In view of this, to achieve higher discharge capacity at a high rate has been an important issue to enable the battery to be used as a power source for hybrid vehicles and electric vehicles.

In the technique suggested to suppress the deterioration in discharge capacity at a high rate, the surface of the negative electrode active material is covered with carbon to allow the negative electrode active material layer to have higher electric conductivity and higher discharge capacity at a high rate.

LIST OF CITATION

Patent Literatures

PATENT LITERATURE 1: JP-A-2001-15101
PATENT LITERATURE 2: JP-A-2004-55505

SUMMARY OF THE INVENTION

Problems to be Solved

However, the improvement in the negative electrode active material itself is not observed in the methods disclosed in Patent Literatures 1 and 2. Therefore, the negative electrode active material is not substantially improved, and is insufficient as the negative electrode active material.

The present invention has been made in view of the above problem of the conventional technique. An object of the present invention is to provide a negative electrode active material with sufficiently high discharge capacity at a high rate, and a negative electrode and a lithium ion secondary battery using the negative electrode active material.

Solution to the Problems

A negative electrode active material according to the present invention is a negative electrode active material containing silicon and silicon oxide, in which a surface layer part of a primary particle of the negative electrode active material has lower density than a core part of the negative electrode active material.

With such a structure of the negative electrode active material, the sufficiently high discharge capacity at a high rate can be achieved.

The ratio (A/B) of the density A of the core part to the density B of the surface layer part of the primary particle in the negative electrode active material according to the present invention is preferably 1.11 or more and 3.12 or less.

This can increase the discharge capacity at a high rate.

The surface layer part preferably contains carbon additionally.

This can increase the discharge capacity at a high rate.

Moreover, the ratio (C/D) of the carbon concentration C to the silicon concentration D in the surface layer part is 2.1 or more and 30.2 or less.

This can increase the discharge capacity at a high rate.

Moreover, the surface layer part preferably contains fluorine additionally.

This can increase the discharge capacity at a high rate.

Further, the ratio (F/D) of the fluorine concentration F to the silicon concentration D in the surface layer part is preferably 0.049 or more and 0.152 or less.

This can remarkably increase the discharge capacity at a high rate.

A negative electrode according to the present invention includes a binder and the aforementioned negative electrode active material on a current collector.

A secondary battery according to the present invention is a lithium ion secondary battery including a positive electrode, the aforementioned negative electrode, a separator disposed therebetween, and an electrolyte solution.

Effects of the Invention

According to the present invention, a lithium ion secondary battery with sufficiently high discharge capacity at a high rate can be provided.

DESCRIPTION OF THE EMBODIMENT

Figure 1:
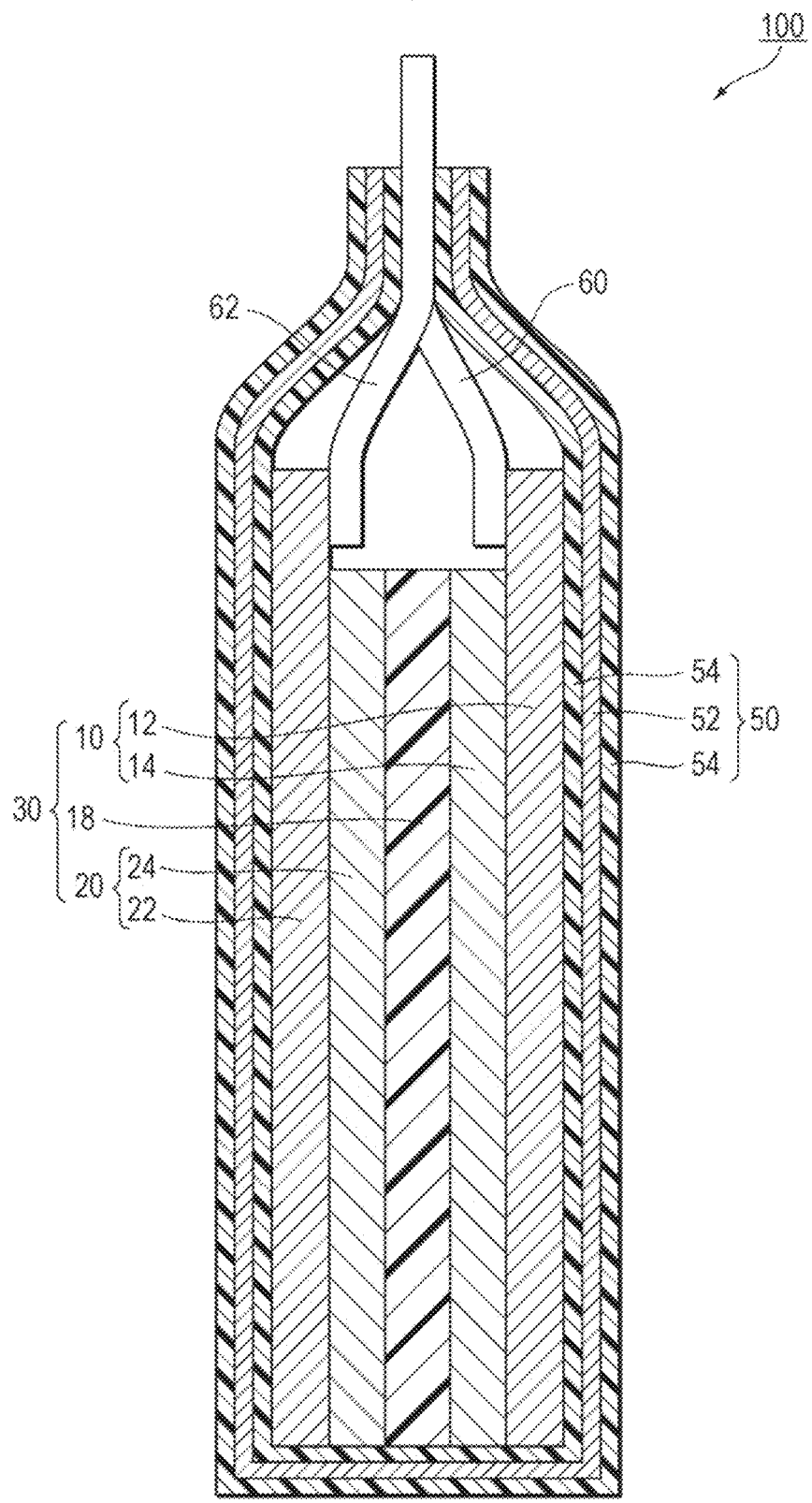
FIG. 1 is a sectional view of a lithium ion secondary battery.

A preferred embodiment of the present invention will be described in detail with reference to the drawings. Throughout the drawings, the same components or corresponding components are denoted by the same reference numerals. The overlapping description is omitted. The ratio among the sizes of the components in the drawing is not limited to that illustrated in the drawing.

(Lithium Ion Secondary Battery)

FIG. 1 is a schematic sectional view illustrating a lithium ion secondary battery according to this embodiment. As illustrated in FIG. 1, a lithium ion secondary battery 100 includes a stacked body 30, and an electrolyte solution containing lithium ions. The stacked body 30 includes a positive electrode 10, a negative electrode 20 provided opposite to the positive electrode 10, and a separator 18. The separator 18 is interposed between the positive electrode 10 and the negative electrode 20 and is in contact with a main plane of the positive electrode 10 and a main plane of the negative electrode 20. The lithium ion secondary battery 100X) mainly includes the stacked body 30, a case 50 housing the stacked body 30 in a sealed state, and a pair of leads 60 and 62 connected to the stacked body 30.

The positive electrode 10 includes a positive electrode current collector 12, and a positive electrode active material layer 14 formed on the positive electrode current collector 12. The negative electrode 20 includes a negative electrode current collector 22, and a negative electrode active material layer 24 formed on the negative electrode current collector 22. The separator 18 is positioned between the negative electrode active material layer 24 and the positive electrode active material layer 14. The case 50 is formed of, for example, a metal laminated film.

(Positive Electrode Active Material Layer)

The positive electrode active material layer 14 is formed on the positive electrode current collector 12. The positive electrode current collector 12 only needs to be formed of a conductive plate material. Examples of the plate material that can be used include a metal thin plate (metal foil) of aluminum, copper, nickel, stainless steel, or an alloy thereof. The positive electrode active material layer 14 includes at least the positive electrode active material and a conductive auxiliary agent. Examples of the conductive auxiliary agent include a carbon material such as carbon blacks, metal powder of copper, nickel, stainless steel, iron, or the like, a mixture of the carbon material and the metal powder, and a conductive oxide such as ITO. The carbon material preferably includes carbon with a tap density of 0.03 to 0.09 g/ml and carbon with a tap density of 0.1 to 0.3 g/ml. The positive electrode active material layer may include a binder that binds the positive electrode active material and the conductive auxiliary agent. The positive electrode active material layer 14 as above is formed through a process of applying, on the positive electrode current collector 12, a coating including the positive electrode active material, the binder, a solvent, and the conductive auxiliary agent.

(Positive Electrode Active Material)

The positive electrode active material of the lithium ion secondary battery according to the embodiment may be a compound as below. Such an active material is not limited in particular as long as this active material can reversibly advance the intercalation and deintercalation of lithium ions or the doping and de-doping between lithium ions and counter anions of the lithium ions (such as $PF_6^-$). Any known active material can be used.

Examples of the positive electrode active material include lithium cobaltate ($LiCoO_2$), lithium nickelate ($LiNiO_2$), lithium manganese spinel ($LiMn_2O_4$), a complex metal oxide represented by general formula: $LiNi_xCo_yMn_zM_aO_2$ (x+y+z+a=1, 0≤x≤1, 0≤y≤1, 0≤z≤1, 0≤a≤1. M represents one or more kinds selected from Al, Mg, Nb, Ti, Cu, Zn, and Cr), a lithium vanadium compound ($LiV_2O_5$), olivine $LiMPO_4$ (M represents one or more kinds selected from Co, Ni, Mn, Fe, Mg, Nb, Ti, Al, and Zr, or VO), and a composite metal oxide such as lithium titanate ($Li_4Ti_5O_{12}$).

(Binder)

The binder binds between the positive electrode active materials to each other, and moreover binds the positive electrode active material and the positive electrode current collector 12 to each other. The binder may be any material that enables the above binding. Examples of the binder include fluorine resin such as polyvinylidene fluoride (PVDF) and polytetrafluoroethylene (PTFE). Moreover, polyimide resin, polyamide-imide resin, styrene-butadiene-styrene block copolymer (SBR), cellulose, ethylene-propylene-diene rubber (EPDM), a product obtained by adding hydrogen to the above material, and a thermoplastic elastomer polymer such as styrene-ethylene-butadiene-styrene block copolymer, styrene-isoprene-styrene block copolymer, and a product obtained by adding hydrogen to the above material may be used.

(Negative Electrode Active Material Layer)

The negative electrode active material layer 24 is formed on the negative electrode current collector 22. The negative electrode current collector 22 may be formed of any plate material with conductivity. For example, a metal thin plate (metal foil) of aluminum, copper, nickel, stainless steel, or an alloy thereof can be used. The negative electrode active material layer 24 is formed mainly of the negative electrode active material, the binder, and a necessary amount of conductive auxiliary agent.

(Negative Electrode Active Material)

Figure 2:
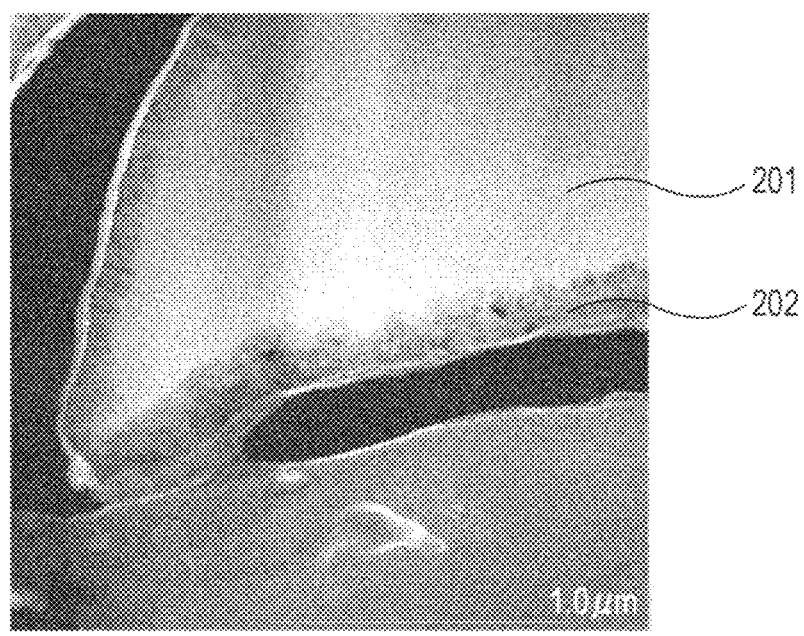
FIG. 2 is a STEM observation image of the cross section of a negative electrode active material.

FIG. 2 illustrates the negative electrode active material according to the embodiment. The negative electrode active material containing silicon and silicon oxide is characterized in that the surface layer part of the primary particle of the negative electrode active material is a layer with lower density than the core part of the negative electrode active material particle.

The surface layer part of the primary particle of such a negative electrode active material is low. Therefore, the negative electrode active material has microscopic gaps. Into the gaps, the electrolyte solution easily enters. When the electrolyte solution permeates the gaps, the contact area between the negative electrode active material and the electrolyte solution expands. Between the negative electrode active material and the electrolyte solution, the transfer of lithium ions is promoted. It is considered that this leads to the higher discharge capacity at a high rate. The density ratio in the present invention is defined by the ratio of the luminance of the core part to the luminance of the surface layer in ADF-STEM image (density ratio=luminance of the core part/luminance of the surface layer).

The ratio (A/B) of the density A of the core part to the density B of the surface layer part in the negative electrode active material is preferably 1.11 or more and 3.12 or less. The ratio A/B is more preferably 1.32 or more and 2.50 or less.

When the ratio A/B is in the above range, the permeability of the electrolyte solution to the surface layer part is particularly increased. Further, the excessive increase in surface area of the surface layer part is prevented, so that the decomposition of the electrolyte solution is suppressed. As a result, the discharge capacity at a high rate is remarkably increased.

The surface layer part preferably contains carbon additionally.

When the surface layer part contains carbon, the surface of the negative electrode active material has higher electric conductivity. It is considered that this leads to the higher discharge capacity at a high rate.

The ratio (C/D) of the carbon concentration C to the silicon concentration D in the surface layer part is preferably 2.1 or more and 30.2 or less. The ratio C/D is more preferably 9.2 or more and 19.6 or less.

When the ratio C/D is in the above range, the negative electrode active material has higher electric conductivity. Moreover, the ion conductivity at the interface between the electrolyte solution and the active material is improved. This leads to the higher discharge capacity at a high rate.

The surface layer part preferably contains fluorine additionally.

Fluorine prevents the oxidation of the negative electrode active material. This can suppress the deterioration in electron conductivity. It is considered that this can maintain the discharge capacity at a high rate.

The ratio (F/D) of the fluorine concentration F to the silicon concentration D in the surface layer part is desirably 0.049 or more and 0.152 or less. The ratio F/D is preferably 0.069 or more and 0.098 or less.

When the ratio F/D is in the above range, the effect of suppressing the oxidation of the negative electrode active material is particularly high. In addition, the ion conductivity at the interface between the electrolyte solution and the active material is improved, and thus the discharge capacity at a high rate is increased.

More preferably, the surface layer part does not contain lithium ions.

When the layer containing lithium is present in the surface layer part of the active material, the potential of the surface layer part of the active material is reduced. This makes it more likely to separate lithium.

The surface layer part preferably has a thickness of 86 nm or more and 579 nm or less. The surface layer part more preferably has a thickness of 124 nm or more and 250 nm or less.

When the thickness of the surface layer part is in the above range, the high permeability of the electrolyte solution is maintained. Further, the excessive increase in surface area of the surface layer part is prevented, so that the decomposition of the electrolyte solution is suppressed. As a result, the discharge capacity at a high rate is remarkably increased.

The surface layer part of the primary particle of the negative electrode active material can be seen by observing the section of the negative electrode active material using the scanning transmission electron microscope (STEM). The density ratio can be calculated based on the ratio of the luminance in the ADF-STEM image.

The ratio between the carbon concentration and the silicon concentration and the ratio between the fluorine concentration and the silicon concentration in the surface layer part can be measured by the electron energy loss spectrometry (EELS).

For one primary particle of the negative electrode active material, the thickness of the surface layer part was measured at four points. This measurement was conducted for ten particles. The average thickness was employed as the thickness of the surface layer part of the primary particle of the negative electrode active material.

The concentration of carbon, silicon, and fluorine in the surface layer part can be measured by the electron energy loss spectrometry (EELS).

For the binder and the conductive auxiliary agent used for the negative electrode active material layer, the materials similar to those of the positive electrode 10 described above can be used. The content of the binder and the conductive auxiliary agent may also be similar to that of the positive electrode 10 except when the adhesion with the foil or the magnitude of the volume change of the negative electrode active material needs to be considered.

The electrodes 10 and 20 can be manufactured by the usual method. For example, the coating including the active material, the binder, the solvent, and the conductive auxiliary agent is applied on the current collector and the solvent is removed out of the coating applied on the current collector, so that the electrodes can be fabricated.

Examples of the solvent that can be used include N-methyl-2-pyrrolidone and N,N-dimethylformamide.

There is no particular limitation on the method of applying. A method that is usually employed to fabricate an electrode can be used. Examples of the applying method include a slit die coating method and a doctor blade method.

There is no particular limitation on the method of removing the solvent from the coating applied on the current collectors 12 and 22. The current collectors 12 and 22 with the coating applied thereon can be dried in the 80° C. to 150° C. atmosphere, for example.

The electrodes with the active material layers 14 and 24 formed thereon in this manner can be pressed with a roll pressing device or the like as necessary. The linear pressure of the roll pressing may be, for example, 10 to 50 kgf/cm.

(Fabrication Method for Negative Electrode Active Material)

The negative electrode active material according to the embodiment is fabricated by a method as below. First, the negative electrode active material containing silicon and silicon oxide is subjected to heat treatment in vacuum together with carbon, so that the negative electrode active material is reduced and is, at the same time, covered with carbon. After that, the negative electrode active material is immersed in a hydrogen fluoride solution. Thus, a low-density layer is formed in the surface layer part of the negative electrode active material particle.

When it is desired that the negative electrode active material is doped with lithium, for example, the negative electrode active material is immersed in the solution including lithium and thus lithium-doping is performed.

Next, the components other than the electrodes of the lithium ion secondary battery 100 will be described.

(Separator)

The separator is not particularly limited as long as the separator is stable relative to the electrolyte solution and has the excellent liquid retaining property. In general, examples thereof include porous sheets or nonwoven fabrics of polyolefins such as polyethylene and polypropylene.

(Electrolyte)

The electrolyte is included in the positive electrode active material layer 14, the negative electrode active material layer 24, and the separator 18. The electrolyte is not particularly limited. Examples of the electrolyte that can be used in the embodiment include an electrolyte solution including a lithium salt (electrolyte aqueous solution and electrolyte solution including organic solvent). The electrolyte aqueous solution, however, has the low decomposing voltage electrochemically. Thus, the withstanding voltage in the charging is restricted to be low. For this reason, the electrolyte is preferably the electrolyte solution including the organic solvent (nonaqueous electrolyte solution). As the electrolyte solution, the electrolyte obtained by dissolving lithium salt in a nonaqueous solvent (organic solvent) is preferable. The lithium salt is not particularly limited. Any lithium salt that can be used as the electrolyte of the lithium ion secondary battery can be used. Examples of the lithium salt that can be used include a salt of a negative ion of the inorganic acid such as $LiPF_6$ and $LiBF_4$ and a salt of a negative ion of the organic acid such as $LiCF_3SO_3$ and $(CF_3SO_2)_2NLi$.

Examples of the organic solvent include an aprotic solvent with a high dielectric constant, such as ethylene carbonate and propylene carbonate, and an aprotic solvent with low viscosity, for example, acetic acid esters such as dimethyl carbonate and ethyl methyl carbonate and propionic acid esters. It is desired that the aprotic solvent with a high dielectric constant and the aprotic solvent with low viscosity may be mixed in an appropriate ratio. Further, ionic liquid including imidazolium, ammonium, and pyridinium cations may be used. The counter anion is not particularly limited. Examples of the counter anion include $BF_4^-$, $PF_6^-$, and $(CF_3SO_2)_2N^-$. The ionic liquid and the organic solvent may be mixed to be used.

The concentration of the lithium salt in the electrolyte solution may be in the range of 0.5 M or more and 2.0 M or less from the aspect of the electric conductivity. The conductivity of this electrolyte at a temperature of 25° C. is preferably 0.01 S/m or more. The conductivity at 25° C. is adjusted depending on the type and concentration of the electrolyte salt.

Moreover, various kinds of additive may be added in the electrolyte solution of this embodiment, as necessary. Examples of the additive include vinylene carbonate and methyl vinylene carbonate for the purpose of improving the cycle life, biphenyl and alkyl biphenyl for the purpose of preventing the overcharging, and various carbonate compounds, various carboxylic anhydrides, and various nitrogen-containing or sulfur-containing compounds for the purpose of deoxidation and dehydration.

(Case)

Inside the case 50, the stacked body 30 and the electrolyte solution are sealed. The case 50 is not particularly limited as long as the leakage of the electrolyte solution to the outside or the intrusion of the moisture or the like from the outside into the lithium ion secondary battery 100 can be suppressed. An example of the usable case 50 is a metal laminated film obtained by coating a metal foil 52 with a polymer film 54 on each side as illustrated in FIG. 1. An example of the usable metal foil 52 is an aluminum foil. An example of the usable polymer film 54 is a film of polypropylene or the like. An example of the material for the polymer film 54 on the outside may be polymer with a high melting point. Preferred examples of such a polymer are polyethylene terephthalate (PET) and polyamide. Preferred examples of the material for the polymer film 54 on the inside are polyethylene (PE) and polypropylene (PP).

(Lead)

The leads 60 and 62 are formed of a conductive material such as aluminum. By the known method, the leads 62 and 60 are welded to the negative electrode current collector 22 and the positive electrode current collector 12, respectively. The positive electrode active material layer 14 of the positive electrode 10 and the negative electrode active material layer 24 of the negative electrode 20 having the separator 18 interposed therebetween are inserted into the case 50 together with the electrolyte solution and then the opening of the case 50 is sealed.

The preferred embodiment of the present invention has been described so far. The present invention, however, is not limited to the embodiment. For example, the shape of the lithium ion secondary battery is not limited to the shape illustrated in FIG. 1. The shape may be a coin-like shape in which the electrode and the separator punched into a coin-like shape are stacked, or a cylinder type in which the electrode sheet and the separator are wound in a spiral shape.

EXAMPLES

The present invention will be described more specifically with reference to Examples and Comparative Examples. The present invention is, however, not limited to the examples below.

Example 1

(Fabrication of Negative Electrode Active Material)

The negative electrode active material was fabricated through the procedure as below. The negative electrode active material containing silicon and silicon oxide was mixed with carbon. The obtained mixture was subjected to heat treatment for three hours at 350° C. in vacuum. Thus, the surface of the negative electrode active material containing silicon and silicon oxide was reduced. Next, this negative electrode active material was immersed in 40 wt/vol % of a hydrofluoric acid solution. Thus, the negative electrode active material was obtained.

(Fabrication of Negative Electrode)

A slurry for the active material layer was prepared by mixing 83 parts by mass of the negative electrode active material. 2 parts by mass of acetylene black, 15 parts by mass of polyamide-imide, and 82 parts by mass of N-methylpyrrolidone. This slurry was applied over a surface of a 14-μm-thick copper foil so that the active material was applied by 2.0 mg/cm². The slurry on the copper foil was dried at 100° C., thereby forming the active material layer. After that, the negative electrode was pressed and molded through roll pressing. Heat treatment was performed for three hours at 350° C. in vacuum, so that the negative electrode with the 18-μm-thick active material layer was obtained.

(Fabrication of Lithium Ion Secondary Battery for Evaluation)

The negative electrode fabricated as above, and as an opposite electrode, a copper foil with a lithium metal foil attached thereto were used. These electrodes were put into an aluminum laminated pack together with a separator formed of a polyethylene microporous film held between the electrodes. Into this aluminum laminated pack, 1 M of $LiPF_6$ solution (solvent: EC/DEC=3/7 (volume ratio)) was poured as the electrolyte solution. After that, the pack was sealed in vacuum, thereby fabricating the lithium ion secondary battery for evaluation.

(Observation of Negative Electrode Active Material)

Figure 3:
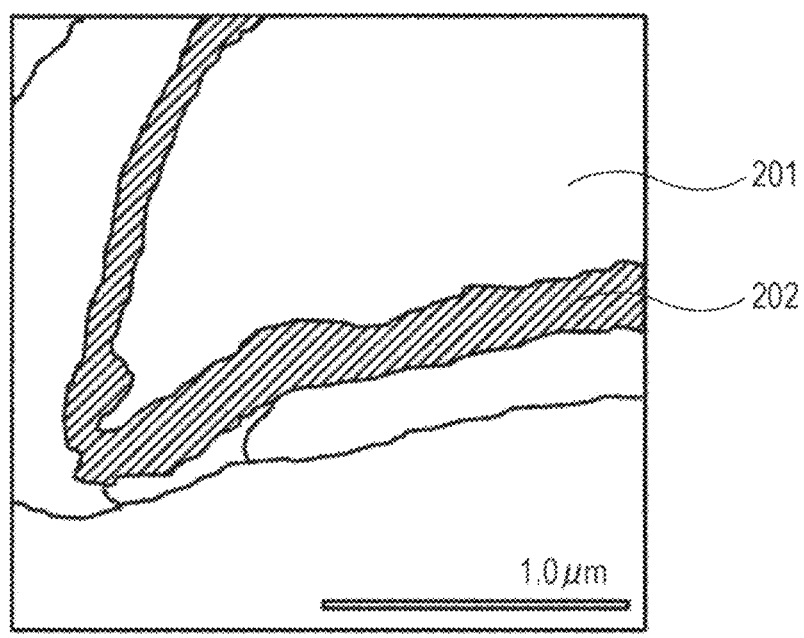
FIG. 3 is a schematic view of the cross section of the negative electrode active material.

The cross section of the negative electrode active material was observed with the scanning transmission electron microscope (STEM). FIG. 2 is the STEM image along the cross section of the negative electrode active material according to Example 1. In FIG. 2, a numeral 201 denotes the core part and a numeral 202 denotes the surface layer part. It has been confirmed that the surface layer part with low density having microscopic gaps is present on the surface of the active material of the obtained negative electrode active material. FIG. 3 schematically shows FIG. 2. In FIG. 3, the surface layer part with low density in FIG. 2 is emphasized with oblique lines.

(Method for Measuring the Density Ratio)

The density ratio was measured through the procedure as below. First, the ADF-STEM image of the cross section of the negative electrode active material was obtained. The difference in scattering intensity of the transmitted electron beam is observed reflecting the difference in density of the photographed sample. This is the reason why the ADF-STEM image has the contrast. Therefore, by calculating the luminance ratio, the density ratio can be obtained. The luminance and the density can be compared based on the standard sample (for example, the material of single-crystal Si or the like with the explicit density can be used). The density was measured by obtaining the luminance at four measurement points within a predetermined 50 nm×50 nm area. The four measurement points were decided through the procedure as below. First, the STEM image along the cross section of the electrode was observed. Any one point on the surface of the particle whose cross section was a polygon with n sides (n>3) was taken as the $X_1$ point. The intersection between the surface of the particle and a line drawn from the $X_1$ point was taken as the $Y_1$ point. Then, the $X_1$ point and the $Y_1$ point at which the line segment $X_1Y_1$ was the maximum were obtained. Next, the intersection between the surface of the particle and the line orthogonal to the line segment $X_1Y_1$ was taken as the $X_2$ point and the $Y_2$ point. Then, the $X_2$ point and the $Y_2$ point at which the line segment $X_2Y_2$ was the maximum were obtained. The four points [$X_1$, $Y_1$, $X_2$, $Y_2$] obtained through the above procedure were decided as the measurement points of the surface layer part. Moreover, four points existing on the line segments and belonging to the core part were selected arbitrarily. The selected four points were taken as the measurement points of the core part. The ratio (A/B) of the density A of the core part to the density B of the surface layer part decided in this manner is shown in Table 1.

(Measurement of Thickness of Surface Layer Part)

The thickness of the surface layer part was measured at four points for each particle. This measurement was performed for 10 particles, and the average thickness was calculated. The four measurement points were decided through the procedure below. First, the STEM image along the cross section of the electrode was observed. Any one point on the surface of the particle whose cross section was a polygon with n sides (n>3) was taken as the $X_1$ point. The intersection between the surface of the particle and a line drawn from the $X_1$ point was taken as the $Y_1$ point. Then, the $X_1$ point and the $Y_1$ point at which the line segment $X_1Y_1$ was the maximum were obtained. Next, the intersection between the surface of the particle and the line orthogonal to the line segment $X_1Y_1$ was taken as the $X_2$ point and the $Y_2$ point. Then, the $X_2$ point and the $Y_2$ point at which the line segment $X_2Y_2$ was the maximum were obtained. The thickness of the surface layer part crossed by the line segments, which start from the base four points [$X_1$, $Y_1$, $X_2$, $Y_2$] obtained through the above procedure, was measured.

(Measurement of Carbon, Fluorine, and Silicon Concentrations)

Through the electron energy loss spectrometry (EELS), the ratio between the carbon concentration C and the silicon concentration D and the ratio between the fluorine concentration F and the silicon concentration D in the surface layer part were measured. In addition, it was confirmed that the surface layer part did not contain lithium. The results are shown in Table 1.

Examples 2 to 15

The negative electrode active materials according to Examples 2 to 15 were obtained through the same procedure as that of Example 1 except that the heat treatment temperature was changed to the temperature in the range of 150 to 450° C. and the concentration of the hydrofluoric acid solution was changed to the concentration in the range of 10 to 50 wt/vol %.

The cross section of the negative electrode active materials according to Examples 2 to 15 was observed using STEM through the same procedure as that of Example 1. As a result, it was confirmed that the surface layer part with low density having microscopic gaps was present on the surface of the negative electrode active material. Moreover, the density ratio and the thickness of the surface layer part were measured through the same procedure as that of Example 1. With the EELS, the carbon, fluorine, and silicon concentrations were measured. The results are shown in Table 1.

With the obtained negative electrode active materials, the negative electrodes and lithium ion secondary batteries for evaluation according to Examples 2 to 15 were fabricated through the same procedure as that of Example 1.

Comparative Example 1

The negative electrode and the lithium ion secondary battery for evaluation according to Comparative Example 1 were fabricated through the same procedure as that of Example 1 except that the heat treatment was not performed and the immersion into the hydrofluoric acid solution was not performed. The cross section of the negative electrode active material according to Comparative Example 1 was observed through the same procedure as that of Example 1. As a result, the difference in density of the negative electrode active material was not observed.

(Measurement of Discharge Capacity at High Rate)

The discharge capacity retention of the lithium ion secondary batteries for evaluation fabricated in Examples and Comparative Examples was measured. The measurement was carried out using the battery charge/discharge system (manufactured by HOKUTO DENKO CORPORATION). The voltage ranged from 0.005 V to 2.5 V. In the measurement, 1 C was set to 1600 mAh % g. The charging and discharging were carried out at a current value of 0.05 C and 5 C. Thus, the ratio of the discharge capacity at 5 C to the discharge capacity at 0.05 C (discharge capacity retention) was measured. The results are shown in Table 1.

TABLE 1

|  | Heat treatment temperature (° C.) | Hydrofluoric acid concentration (wt/vol %) | Ratio (C/D) of carbon concentration C to silicon concentration D in surface layer part | Ratio of fluorine concentration F to silicon concentration D in surface layer part (F/D) | Ratio of core part density A to surface layer part density B (A/B) | Thickness of surface layer part (nm) | Discharge capacity retention (%) |
|---|---|---|---|---|---|---|---|
| Example 1 | 350 | 40 | 13.9 | 0.089 | 2.12 | 156 | 72.4 |
| Example 2 | 250 | 30 | 10.4 | 0.087 | 1.49 | 155 | 72.3 |
| Example 3 | 300 | 30 | 8.1 | 0.098 | 1.37 | 136 | 69.2 |
| Example 4 | 350 | 30 | 5.8 | 0.069 | 1.32 | 124 | 68.9 |

TABLE 1-continued

|  | Heat treatment temperature (° C.) | Hydrofluoric acid concentration (wt/vol %) | Ratio (C/D) of carbon concentration C to silicon concentration D in surface layer part | Ratio of fluorine concentration F to silicon concentration D in surface layer part (F/D) | Ratio of core part density A to surface layer part density B (A/B) | Thickness of surface layer part (nm) | Discharge capacity rentention (%) |
|---|---|---|---|---|---|---|---|
| Example 5 | 400 | 30 | 4.1 | 0.058 | 1.19 | 100 | 67.2 |
| Example 6 | 450 | 30 | 2.1 | 0.049 | 1.11 | 86 | 66.7 |
| Example 7 | 150 | 50 | 30.2 | 0.152 | 3.12 | 579 | 65.2 |
| Example 8 | 200 | 50 | 27.9 | 0.143 | 2.96 | 451 | 65.5 |
| Example 9 | 300 | 50 | 23.6 | 0.118 | 2.76 | 367 | 67.2 |
| Example 10 | 350 | 50 | 21.8 | 0.107 | 2.68 | 298 | 67.5 |
| Example 11 | 400 | 50 | 19.6 | 0.101 | 2.59 | 263 | 67.8 |
| Example 12 | 450 | 50 | 18.2 | 0.091 | 2.47 | 146 | 71.2 |
| Example 13 | 450 | 40 | 9.7 | 0.071 | 1.4 | 251 | 71.7 |
| Example 14 | 400 | 40 | 9.2 | 0.07 | 2.5 | 250 | 69.9 |
| Example 15 | 200 | 30 | 17.8 | 0.073 | 1.86 | 233 | 72.1 |
| Comparative Example 1 | — | — | — | — | 1 | — | 60.2 |

The results in Table 1 show that the lithium ion secondary battery including the negative electrode active material whose surface includes the surface layer part with low density having microscopic gaps according to any of Examples 1 to 15 exhibits higher discharge capacity retention at a high rate than the lithium ion secondary battery according to Comparative Example 1 where the surface layer part with low density having microscopic gaps is not present on the surface of the negative electrode active material.

INDUSTRIAL APPLICABILITY

When the negative electrode active material according to the present invention is used for a lithium ion secondary battery, the battery with sufficiently high discharge capacity at a high rate can be provided.

LIST OF NUMERAL REFERENCES

10 Positive electrode
12 Positive electrode current collector
14 Positive electrode active material layer
18 Separator
20 Negative electrode
22 Negative electrode current collector
24 Negative electrode active material layer
30 Stacked body
50 Case
52 Metal foil
54 Polymer film
60, 62 Lead
100 Lithium ion secondary battery
201 Core part
202 Surface layer part

The invention claimed is:

1. A negative electrode active material containing silicon and silicon oxide, wherein
   a surface layer part of a primary particle of the negative electrode active material has lower density than a core part of the negative electrode active material,
   a ratio (A/B) of density A of the core part to density B of the surface layer part of the negative electrode active material is 1.11 or more and 3.12 or less,
   the surface layer part further contains carbon and fluorine, and
   a ratio (C/D) of carbon concentration C to silicon concentration D in the surface layer part is 9.7 or more and 17.8 or less.

2. The negative electrode active material according to claim 1, wherein a ratio (F/D) of fluorine concentration F to silicon concentration D in the surface layer part is 0.049 or more and 0.152 or less.

3. A negative electrode comprising a binder and the negative electrode active material according to claim 1 on a current collector.

4. A lithium ion secondary battery comprising:
   a positive electrode;
   the negative electrode according to claim 3;
   a separator disposed between the positive electrode and the negative electrode; and
   an electrolyte solution.

5. A negative electrode comprising a binder and the negative electrode active material according to claim 2 on a current collector.

6. The negative electrode active material according to claim 1, wherein the ratio (A/B) is 1.32 or more and 2.50 or less.

7. The negative electrode active material according to claim 2, wherein the ratio (F/D) is 0.069 or more and 0.098 or less.

* * * * *